US012671520B2

(12) United States Patent
Chang et al.

(10) Patent No.: US 12,671,520 B2
(45) Date of Patent: Jun. 30, 2026

(54) DUPLICATED PACKET TRANSMISSION METHOD AND APPARATUS THEREOF

(71) Applicant: MEDIATEK INC., Hsinchu City (TW)

(72) Inventors: Chia-Hsiang Chang, Hsinchu City (TW); Ying-You Lin, Hsinchu City (TW); Cheng-En Hsieh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 291 days.

(21) Appl. No.: 18/240,694

(22) Filed: Aug. 31, 2023

(65) Prior Publication Data

US 2024/0080138 A1      Mar. 7, 2024

Related U.S. Application Data

(60) Provisional application No. 63/374,375, filed on Sep. 2, 2022.

(51) Int. Cl.
H04L 1/00 (2006.01)
H04L 1/08 (2006.01)
H04L 1/1812 (2023.01)
H04L 1/20 (2006.01)

(52) U.S. Cl.
CPC .............. H04L 1/0008 (2013.01); H04L 1/08 (2013.01); H04L 1/1819 (2013.01); H04L 1/203 (2013.01)

(58) Field of Classification Search
CPC ....... H04L 1/0008; H04L 1/08; H04L 1/1819; H04L 1/203
See application file for complete search history.

(56) References Cited

U.S. PATENT DOCUMENTS

| | | | |
|---|---|---|---|
| 11,729,666 B2 | 8/2023 | Liu | |
| 2017/0048048 A1 | 2/2017 | Seok | |
| 2021/0136735 A1* | 5/2021 | Lin | ........................ H04W 74/04 |
| 2021/0352722 A1* | 11/2021 | Xin | ........................... H04L 1/08 |
| 2023/0147636 A1* | 5/2023 | Kim | .................. H04W 52/0229 |
| | | | 370/318 |
| 2024/0334509 A1* | 10/2024 | Hwang | ................. H04W 74/08 |

FOREIGN PATENT DOCUMENTS

TW          202015371 A          4/2020

OTHER PUBLICATIONS

Chinese language office action dated Mar. 8, 2024, issued in application No. TW 112133292.

* cited by examiner

*Primary Examiner* — Wayne H Cai

(74) *Attorney, Agent, or Firm* — McClure, Qualey & Rodack, LLP

(57) ABSTRACT

Duplicated packet transmission methods are provided. The duplicated packet transmission method may include the following steps. A sender may determine whether to pad at least one duplicated packet into a multi-user physical-protocol-data-unit (MU-PPDU) based on at least one condition. Then, the sender may transmit the MU-PPDU with the duplicated packet to at least one receiver when the condition is met.

20 Claims, 9 Drawing Sheets

DUPLICATED PACKET TRANSMISSION METHOD AND APPARATUS THEREOF

CROSS REFERENCE TO RELATED APPLICATIONS

This application claims the benefits of U.S. Provisional Application No. 63/374,375 filed on Sep. 2, 2022, the entirety of which is incorporated by reference herein.

BACKGROUND OF THE INVENTION

Field of the Invention

The invention generally relates to wireless communications technology, and more particularly, to a duplicated packet transmission in a multi-user physical-protocol-data-unit (MU-PPDU).

Description of the Related Art

As demand for ubiquitous computing and networking has grown, various wireless technologies have been developed, including Wireless-Fidelity (Wi-Fi) which is a Wireless Local Area Network (WLAN) technology allowing mobile devices, such as a smartphone, a smart pad, a laptop computer, a portable multimedia player, an embedded apparatus, or the like, to obtain wireless services in a frequency band of 2.4 GHz, 5 GHz, 6 Gz or 60 GHz.

The Institute of Electrical and Electronics Engineers (IEEE) has commercialized or developed various technological standards since an initial WLAN technology is supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve performance and meet users' demand for high-capacity and high-rate services, IEEE 802.11ax has been proposed, which uses both Orthogonal Frequency Division Multiple Access (OFDMA) and MU-MIMO in both DL and uplink (UL) directions. That is, in addition to supporting frequency and spatial multiplexing from an AP to multiple STAs, transmissions from multiple STAs to the AP are also supported in IEEE 802.11ax.

In IEEE 802.11ax, a Resource Unit (RU) refers a group of 78.125 KHz bandwidth subcarriers (tones) used in both DL and UL transmissions for a single STA, and a Multi-User-Physical layer Protocol Data Unit (MU-PPDU) may carry multiple RUs, allowing multiple users to access an AP simultaneously and efficiently.

In conventional technology, in the MU-PPDU, the scheduling in each RU corresponding to each STA may be aligned based on the STA which transmits the most packets. Therefore, the delimiters (e.g., dummy packets) need to be padded into the padding areas in the RUs corresponding to some STAs with low throughput. The padding areas for the delimiters will be wasted.

Therefore, how to use the padding areas for the delimiters more efficiently and flexibly is a topic that is worthy of discussion.

BRIEF SUMMARY OF THE INVENTION

Duplicated packet transmission methods and apparatus are provided to overcome the problems mentioned above.

An embodiment of the invention provides a duplicated packet transmission method. The duplicated packet transmission method may comprise the following steps. A sender may determine whether to pad at least one duplicated packet into a multi-user physical-protocol-data-unit (MU-PPDU) based on at least one condition. Then, the sender may transmit the MU-PPDU with said duplicated packet to at least one receiver in response to said condition being met.

An embodiment of the invention provides a sender for a duplicated packet transmission. The sender may comprise a processor and a transceiver. The processor may determine whether to pad at least one duplicated packet into a multi-user physical-protocol-data-unit (MU-PPDU) based on at least one condition. The transceiver may transmit the MU-PPDU with said duplicated packet to at least one receiver in response to said condition being met.

An embodiment of the invention provides a station (STA) for a duplicated packet transmission. The STA may comprise a processor and a transceiver. The transceiver may receive a downlink (DL) multi-user physical-protocol-data-unit (MU-PPDU) with at least one duplicated packet from an access point (AP) and transmitting a medium access control (MAC) PDU (MPDU) with said duplicated packet in the MU-PPDU to the AP. Said duplicated packet may be padded into the MU-PPDU in response to at least one condition being met.

Other aspects and features of the invention will become apparent to those with ordinary skill in the art upon review of the following descriptions of specific embodiments of the duplicated packet transmission methods and apparatus.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
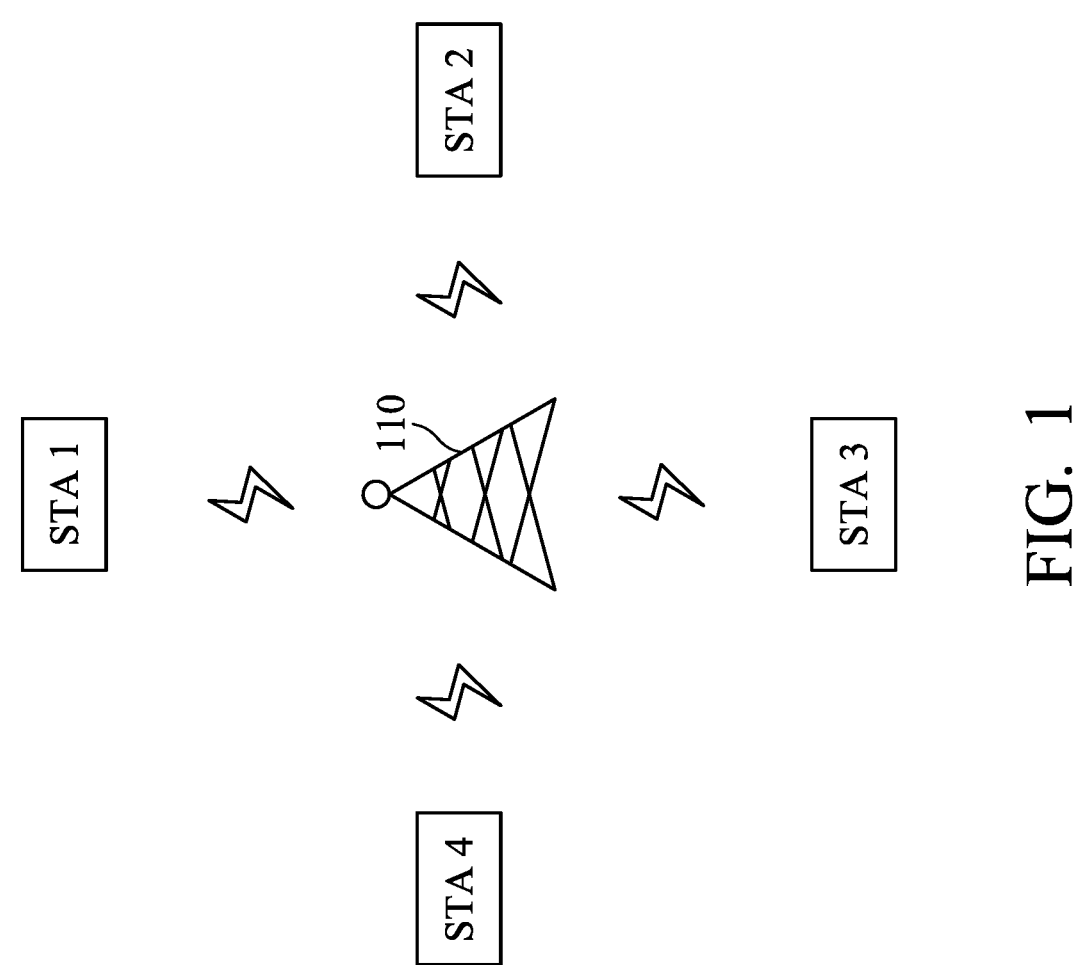
FIG. 1 is a block diagram of a wireless communication system 100 according to an embodiment of the application.

FIG. 1 is a block diagram of a wireless communication system 100 according to an embodiment of the application. As shown in FIG. 1, the wireless communication system 100 may include an Access Point (AP) 110 and a plurality of stations (STAs) 1~4. The AP 110 is an entity compatible with the Institute of Electrical and Electronics Engineers (IEEE) 802.11 standards to provide and manage the access to the wireless medium for the STAs 1~4. It should be noted that, in order to clarify the concept of the invention, FIG. 1 presents a simplified block diagram in which only the elements relevant to the invention are shown. However, the invention should not be limited to what is shown in FIG. 1. For example, the wireless communication system 100 may include more or fewer STAs.

In an embodiment of the invention, the AP 110 may be an Extremely High Throughput (EHT) AP which is compatible with the IEEE 802.11be standards. In another embodiment of the invention, the AP 110 may be an AP which is compatible with any IEEE 802.11 standards later than 802.11be.

Each of the STAs 1~4 may be a mobile phone (e.g., feature phone or smartphone), a panel Personal Computer (PC), a laptop computer, or any computing device, as long as it is compatible with the same IEEE 802.11 standards as the AP 110. Each of the STAs 1~4 may associate and communicate with the AP 110 to send or receive data in an uplink (UL) or downlink (DL) Multi-User-Physical layer Protocol Data Unit (MU-PPDU). The MU-PPDU may be a resource-unit Orthogonal Frequency Division Multiple Access (RU-OFDMA), a MU-Multiple Input-Multiple-Output (MU-MIMO) PPDU, or an aggregated PPDU.

Figure 2:
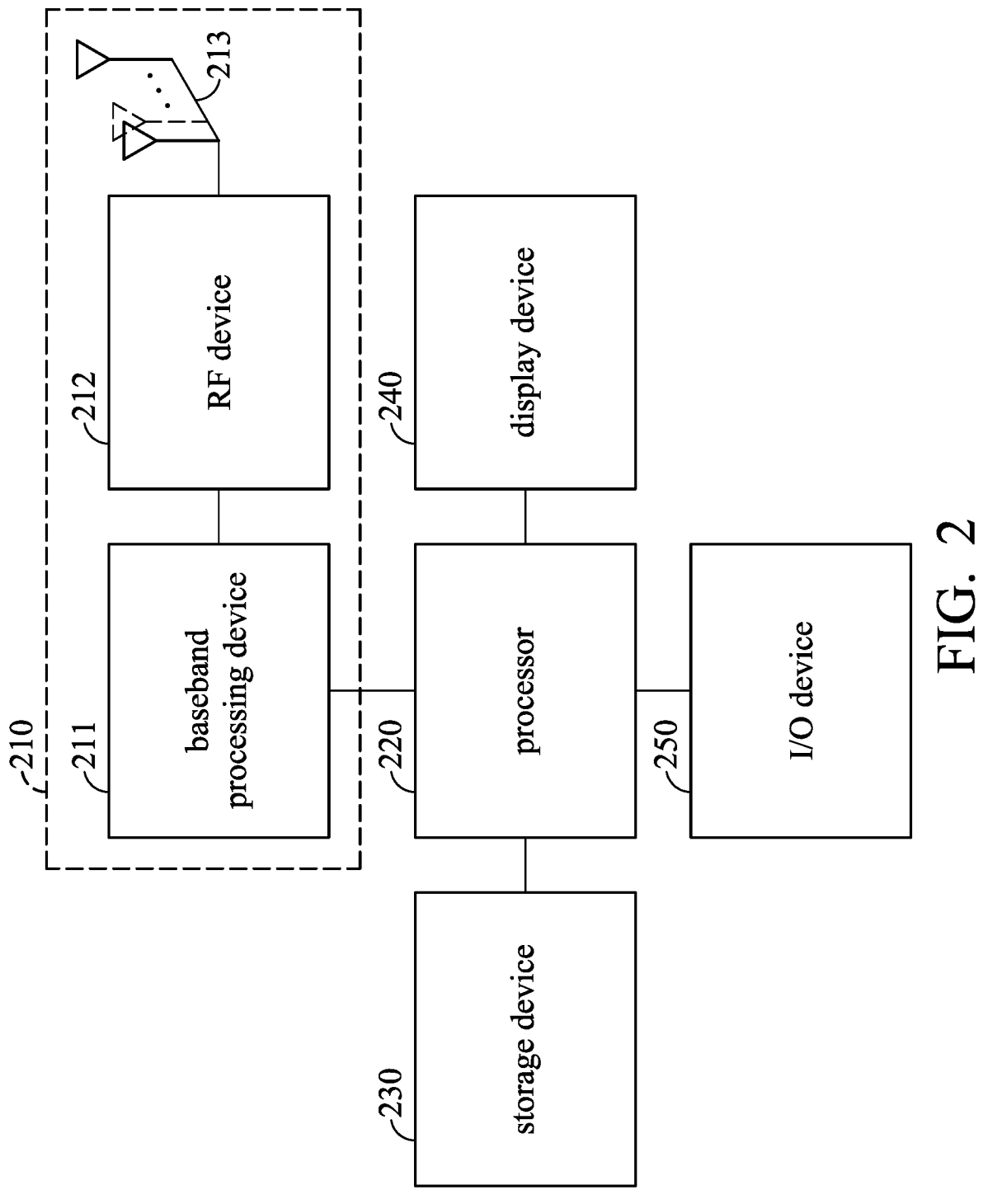
FIG. 2 is a block diagram illustrating an STA according to an embodiment of the application.

FIG. 2 is a block diagram illustrating an STA according to an embodiment of the application. As shown in FIG. 2, an STA may include a wireless transceiver 210, a processor 220, a storage device 230, a display device 240, and an Input/Output (I/O) device 250.

The wireless transceiver 210 may be configured to perform wireless transmission and reception to and from the AP 210. For example, the wireless transceiver 10 may be a Wi-Fi chip.

Specifically, the wireless transceiver 210 may include a baseband processing device 211, a Radio Frequency (RF) device 212, and antenna 213, wherein the antenna 213 may include an antenna array for UL/DL MIMO.

The baseband processing device 211 may be configured to perform baseband signal processing, such as Analog-to-Digital Conversion (ADC)/Digital-to-Analog Conversion (DAC), gain adjusting, modulation/demodulation, encoding/decoding, and so on. The baseband processing device 211 may contain multiple hardware components, such as a baseband processor, to perform the baseband signal processing.

The RF device 212 may receive RF wireless signals via the antenna 213, convert the received RF wireless signals to baseband signals, which are processed by the baseband processing device 211, or receive baseband signals from the baseband processing device 211 and convert the received baseband signals to RF wireless signals, which are later transmitted via the antenna 213. The RF device 212 may also contain multiple hardware devices to perform radio frequency conversion. For example, the RF device 212 may include a mixer to multiply the baseband signals with a carrier oscillated in the radio frequency of the supported cellular technologies, wherein the radio frequency may be 2.4 GHz, 5 GHz, 6 GHZ, or 60 GHz utilized in the Wi-Fi technology, or any radio frequency utilized in the future evolution of the Wi-Fi technology.

The processor 220 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 210 for wireless communications with the AP 110, storing and retrieving data (e.g., program code) to and from the storage device 230, sending a series of frame data (e.g. representing text messages, graphics, images, etc.) to the display device 240, and receiving user inputs or outputting signals via the I/O device 250.

In particular, the processor 220 coordinates the aforementioned operations of the wireless transceiver 210, the storage device 230, the display device 240, and the I/O device 50 for performing the method of the present application.

In another embodiment, the processor 220 may be incorporated into the baseband processing device 211, to serve as a baseband processor.

As will be appreciated by persons skilled in the art, the circuits of the processor 220 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 230 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 240 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors for sensing touches, contacts, or approximations of objects, such as fingers or styluses.

The I/O device 250 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, an STA may include more components, such as another wireless transceiver for providing telecommunication services, a Global Positioning System (GPS) device for use of some location-based services or applications, and/or a battery for powering the other components of the STA, etc. Alternatively, an STA may include fewer components. For example, the STA may not include the display device 240 and/or the I/O device 250.

Figure 3:
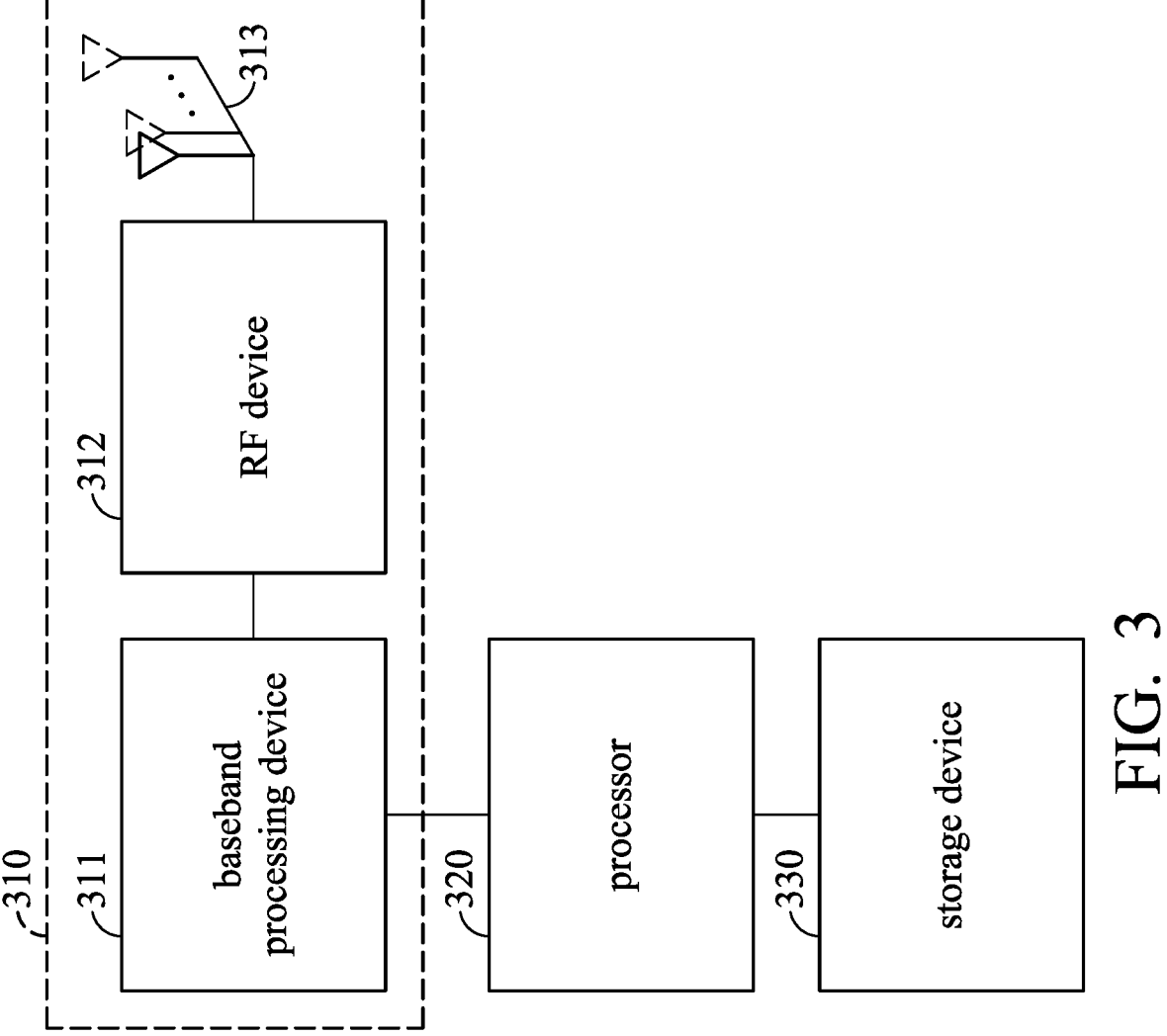
FIG. 3 is a block diagram illustrating an AP according to an embodiment of the application.

FIG. 3 is a block diagram illustrating an AP according to an embodiment of the application. As shown in FIG. 3, an AP may include a wireless transceiver 310, a processor 320, and a storage device 330.

The wireless transceiver 310 is configured to perform wireless transmission and reception to and from one or more STAs (e.g., the STAs 1~4). For example, the wireless transceiver 310 may be a Wi-Fi chip.

Specifically, the wireless transceiver 310 may include a baseband processing device 311, an RF device 312, and antenna 313, wherein the antenna 313 may include an antenna array for UL/DL MU-MIMO.

The baseband processing device 311 is configured to perform baseband signal processing, such as ADC/DAC, gain adjusting, modulation/demodulation, encoding/decoding, and so on. The baseband processing device 61 may contain multiple hardware components, such as a baseband processor, to perform the baseband signal processing.

The RF device 312 may receive RF wireless signals via the antenna 313, convert the received RF wireless signals to baseband signals, which are processed by the baseband processing device 311, or receive baseband signals from the baseband processing device 311 and convert the received baseband signals to RF wireless signals, which are later transmitted via the antenna 313. The RF device 312 may also contain multiple hardware devices to perform radio frequency conversion. For example, the RF device 312 may include a mixer to multiply the baseband signals with a carrier oscillated in the radio frequency of the supported cellular technologies, wherein the radio frequency may be 2.4 GHz, 5 GHz, 6 GHz, or 60 GHz utilized in the Wi-Fi technology, or any radio frequency utilized in the future evolution of the Wi-Fi technology.

The processor 320 may be a general-purpose processor, an MCU, an application processor, a DSP, a GPH/HPU/NPU, or the like, which includes various circuits for providing the functions of data processing and computing, controlling the wireless transceiver 310 for wireless communications with the STAs 1~4, and storing and retrieving data (e.g., program code) to and from the storage device 330.

In particular, the processor 320 coordinates the aforementioned operations of the wireless transceiver 310 and the storage device 330 for performing the method of the present application.

In another embodiment, the processor 320 may be incorporated into the baseband processing device 61, to serve as a baseband processor.

As will be appreciated by persons skilled in the art, the circuits of the processor 320 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 330 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the method of the present application.

It should be understood that the components described in the embodiment of FIG. 3 are for illustrative purposes only and are not intended to limit the scope of the application. For example, an AP may include more components, such as a display device for providing a display function, and/or an I/O device for providing an MMI for interaction with users.

Figure 4:
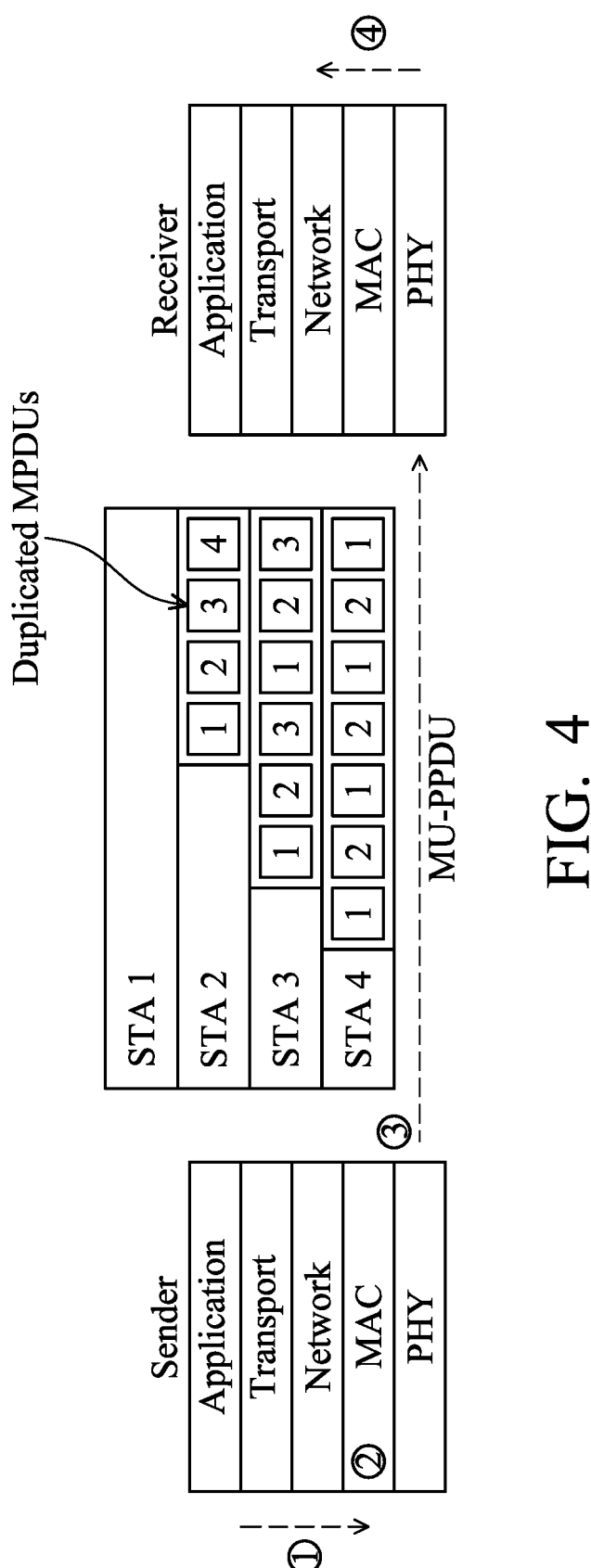
FIG. 4 is schematic diagram illustrating a duplicated packet transmission according to an embodiment of the invention.

FIG. 4 is schematic diagram illustrating a duplicated packet transmission according to an embodiment of the invention. In FIG. 4, in an example, the sender may be an AP and the receiver may be a plurality of STAs (e.g., STA 1~4). In another example, the sender may be a plurality of STAs (e.g., STA 1~4), and the receiver may be an AP.

As shown in FIG. 4, in step 1, the sender may transmit the medium access control (MAC) service data units (MSDUs) from the network layer to MAC layer. In addition, the sender may pack the MSDUs as the aggregated-MSDUs (A-MSDUs).

In step 2, the sender may pack the A-MSDUs as MAC PDUs (MPDUs) and enqueue the A-MSDUs to MAC queues.

In step 3, the sender may determine whether to pad duplicated packets (or duplicated MPDUs) into the MU-PPDU based on at least one condition. The MU-PPDU may comprise RU-OFDMA or MU-MIMO. When said condition is met, the sender may transmit the MU-PPDU with said duplicated packet to the receiver. Specifically, when the condition is met, the sender may pad the duplicated packets into the padding area in the MU-PPDU. In conventional technology, the delimiters (e.g., an MPDU delimiter) may be padded into the padding area. However, in the embodiments of the invention, the duplicated packets (or duplicated MPDUs) will be padded into the padding area instead of adding delimiters. In addition, the sender may generate the duplicated MPDUs based on the MPDUs in the same RU in the MU-PPDU.

Taking FIG. 4 as an example, the STA 1 may transmit or receive 8 MPDUs with sequence numbers 1~8 to or from the MU-PPDU, the STA 2 may transmit or receive 4 MPDUs with sequence numbers 1~4 to or from the MU-PPDU, the STA 3 may transmit or receive 3 MPDUs with sequence numbers 1~3 to or from the MU-PPDU and the STA 4 may transmit or receive 2 MPDUs with sequence numbers 1~2 to or from the MU-PPDU. Specifically, in the embodiment shown in FIG. 4, 8 MPDUs can be transmitted within the duration or transmission time of MU-PPDU, but only 4, 3, and 2 MPDUs are transmitted for STA2, STA3, and STA4 respectively. The data originally transmitted by the RU for STA2, STA3, and STA4 (such as 4 MPDUs with sequence numbers 1 to 4 for STA2, 3 MPDUs with sequence numbers 1 to 3 for STA3, and 2 MPDUs with sequence numbers 1 to 2 for STA 4) is far from reaching the duration of the MU-PPDU. Therefore, the embodiment of the present invention may be proposed for the remaining time (i.e., padding area) of the corresponding RU. That is, the duplicated MPDU of the corresponding STA will be transmitted in the same RU of the corresponding STA. In the RU for STA 2 in the MU-PPDU, the sender may pad the duplicated MPDUs 1~4 into the padding area in the RU for STA 2 based on MPDUs 1~4 corresponding to STA 2, in the RU for STA 3 in the MU-PPDU, the sender may pad the duplicated MPDUs 1-3 into the padding area in the RU for STA 3 based on MPDUs 1-3 corresponding to STA 3, and in the RU for STA 4 in the MU-PPDU, the sender may pad the duplicated MPDUs 1-2 into the padding area in the RU for STA 4 based on MPDUs 1-2 corresponding to STA 4. Because all spaces of the RU for STA 1 have been used to transmit or receive the MPDUs, no duplicated MPDU needs to be padded.

In the embodiments of the invention, if the packet error occurs in the data transmission, the duplicated packets (or duplicated MPDUs) can be used to reduce the packet error rate.

In step 4, when the receiver receives the MU-PPDU, the duplicated packets (or duplicated MPDUs) may be filtered in the block-ACK re-ordering phase. Therefore, comparing to pad delimiters in the padding area of the MU-PPDU, padding the duplicated packets may not increase more power consumption than padding delimiters.

In an embodiment of the invention, a duplicated packet engine may be configured in the sender. The operations of the duplicated packet engine may be performed in the MAC layer corresponding to the sender, or in the host platform of the sender.

In an embodiment of the invention, in the MU-PPDU, the number of the padded duplicated packet for different RUs may be different or the same. For example, as shown in FIG. 4, the number of the duplicated MPDUs in the RU for STA 2 is 4, the number of the duplicated MPDUs in the RU for STA 3 is 6, and the number of the duplicated MPDUs in the RU for STA 4 is 7, but the invention should not be limited thereto.

In an embodiment of the invention, the condition may be that the delimiter ratio (i.e., the proportion of the padding area in a RU of the MU-PPDU) in the MU-PPDU is higher than a threshold. When the delimiter ratio in the MU-PPDU is higher than the threshold, the sender may pad the duplicated packets into the MU-PPDU.

In another embodiment of the invention, the condition may be that the packet error rate (PER) in the MU-PPDU is higher than a threshold. When the PER in the MU-PPDU is higher than the threshold, the sender may pad the duplicated packets into the MU-PPDU.

The condition may also be related to the received signal strength indication (RSSI), the user number, the throughput, the beacon failure rate, or the channel state, but the invention should not be limited thereto.

Figure 5:
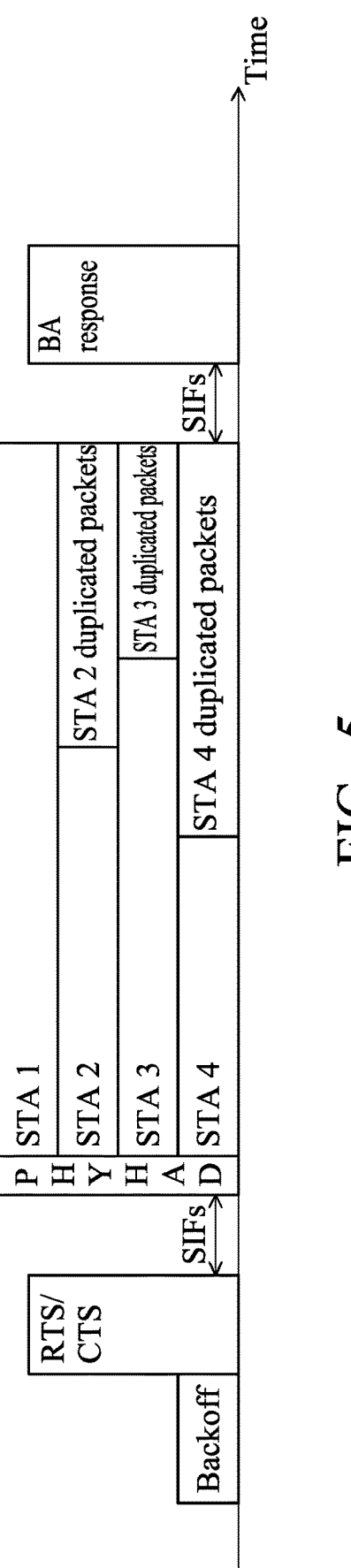
FIG. 5 is schematic diagram illustrating a DL MU-PPDU over single-link according to an embodiment of the invention.

In an embodiment of the invention, in a downlink (DL) transmission for a single-link, the sender may be an access point (AP). That is, in the embodiment, the AP may be configured to pad the duplicated packets (or duplicated MPDUs) into the MU-PPDU. FIG. 5 is schematic diagram illustrating a DL MU-PPDU over single-link according to an embodiment of the invention. As shown in FIG. 5, the AP may pad the duplicated packets (or duplicated MPDUs) for the STA 2, STA 3 and STA 4 into the MU-PPDU.

Figure 6:
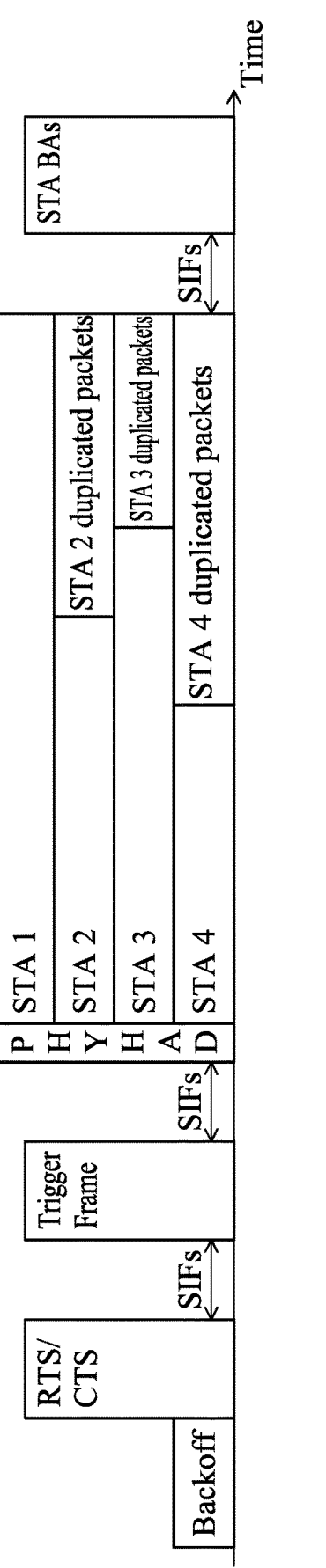
FIG. 6 is schematic diagram illustrating an UL trigger MU-PPDU over single-link according to an embodiment of the invention.

In another embodiment of the invention, in an uplink (UL) transmission for a single-link, the sender comprises a plurality of stations (STAs) corresponding to the MU-PPDU. That is, in the embodiment, the STAs may be configured to pad the duplicated packets (or duplicated MPDUs) into the MU-PPDU. FIG. 6 is schematic diagram illustrating an UL trigger MU-PPDU over single-link according to an embodiment of the invention. As shown in FIG. 6, the STA 2 may pad the duplicated packets (or duplicated MPDUs) for the STA 2 into the MU-PPDU, the STA 3 may pad the duplicated packets (or duplicated MPDUs) for the STA 3 into the MU-PPDU and the STA 4 may pad the duplicated packets (or duplicated MPDUs) for the STA 4 into the MU-PPDU. Specifically, the STA (e.g., STA 1~4) may receive a trigger frame from the AP. The trigger frame may indicate the scheduling information for the RUs corresponding to different STAs in the MU-PPDU. Each STA (e.g., STA 1~4) may determine whether to pad the duplicated packets (or duplicated MPDUs) into its corresponding RU in the MU-PPDU based on the trigger configuration and the condition.

Figure 7:
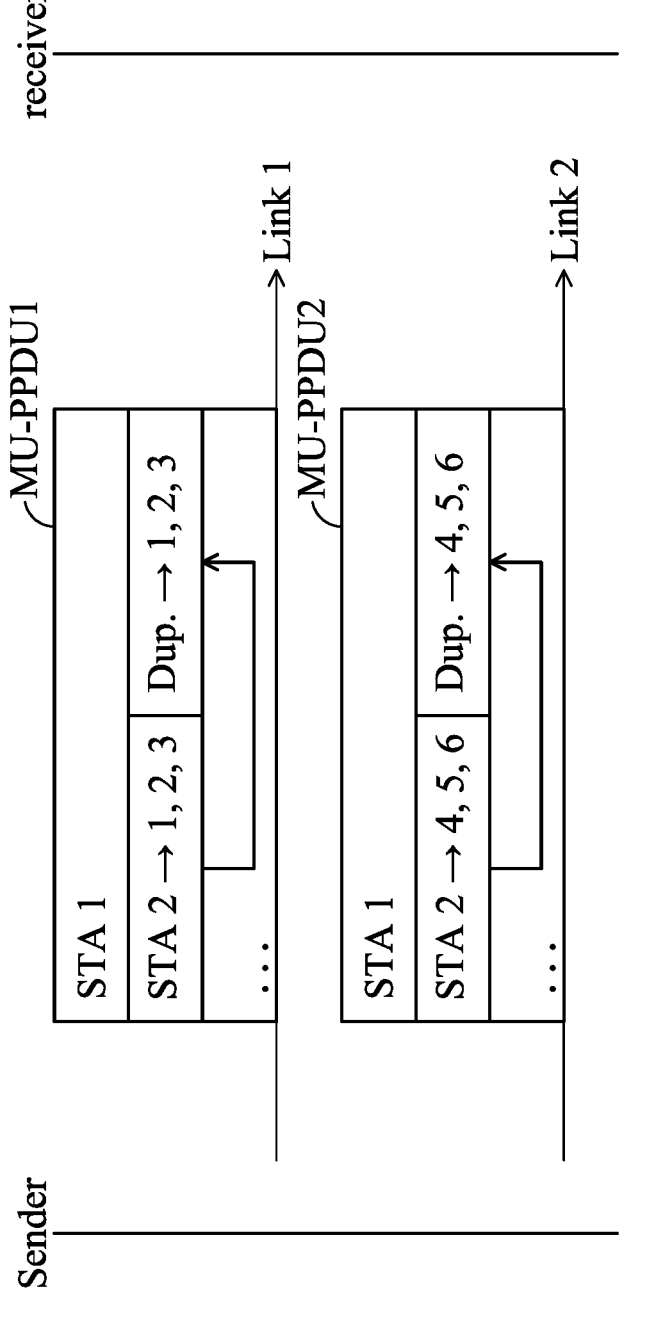
FIG. 7 is schematic diagram illustrating a duplicated packets transmission over multi-link according to an embodiment of the invention.

In an embodiment of the invention, in a multi-link transmission, the duplicated packets (or duplicated MPDUs) may be padded into the MU-PPDU in the same link. FIG. 7 is schematic diagram illustrating a duplicated packets transmission over multi-link according to an embodiment of the invention. As shown in FIG. 7, the sender may pad the duplicated packets (or duplicated MPDUs) 1, 2 and 3 into the MU-PPDU 1 in the same link (i.e., link 1) as the packets 1, 2 and 3, and pad the duplicated packets (or duplicated MPDUs) 4, 5 and 6 into the MU-PPDU 2 in the same link (i.e., link 2) as the packets 4, 5 and 6.

Figure 8:
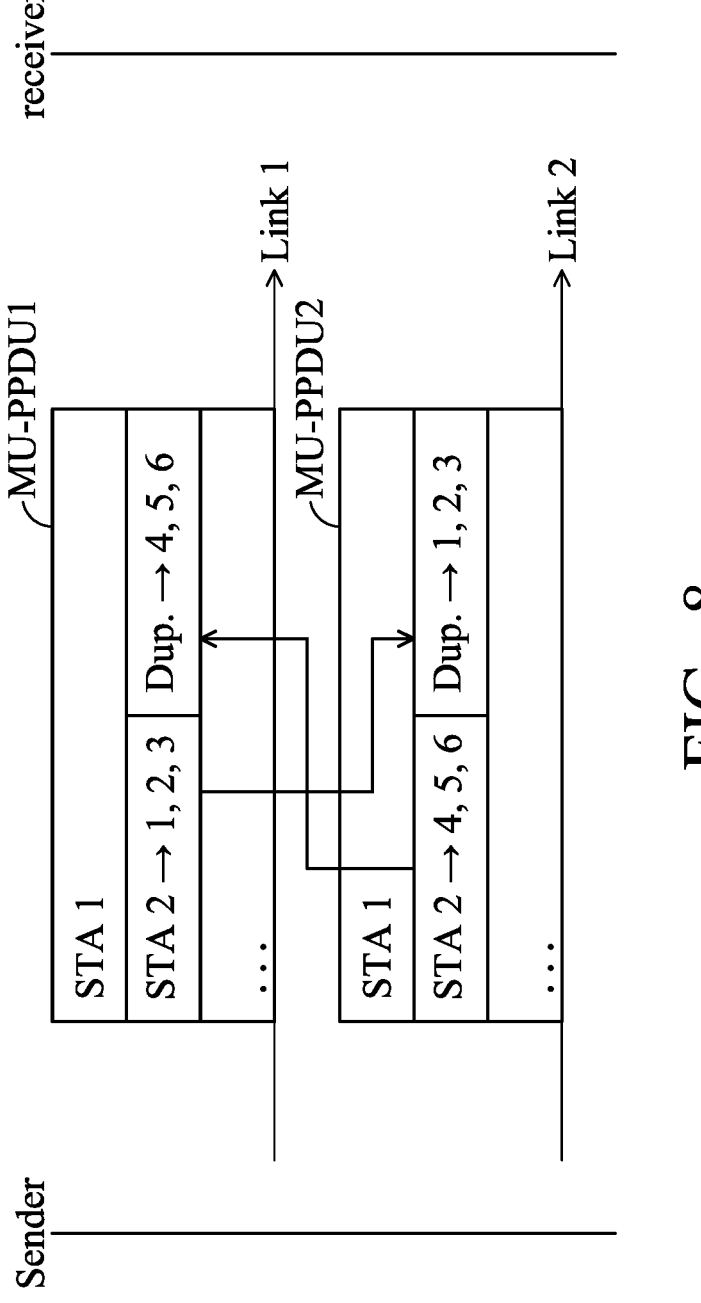
FIG. 8 is schematic diagram illustrating a duplicated packets transmission over multi-link according to another embodiment of the invention.

In another embodiment of the invention, in a multi-link transmission, the duplicated packets (or duplicated MPDUs) may be padded into the MU-PPDU in different links. FIG. 8 is schematic diagram illustrating a duplicated packets transmission over multi-link according to another embodiment of the invention. As shown in FIG. 8, the sender may pad the duplicated packets (or duplicated MPDUs) 1, 2 and 3 into the MU-PPDU 2 in link 2 rather than link 1 as packets (or duplicated MPDUs) 1, 2 and 3, and pad the duplicated packets (or duplicated MPDUs) 4, 5 and 6 into the MU-PPDU 1 in the link 1 rather than link 2 as packets (or duplicated MPDUs) 4, 5 and 6. For example, duplicate packets can be transmitted across the links. It can be understood that in the example embodiment shown in FIG. 8, MU-PPDU1 and MU-PPDU2 are transmitted simultaneously. Therefore, in the case of multiple MU-PPDUs being transmitted simultaneously on multiple links, the first duplicate packets (e.g., the duplicate packets with the sequence numbers 4, 5, 6) in a MU-PPDU (e.g., MU-PPDU 1) for a specific STA (e.g., STA2) can be transmitted in another MU-PPDU (e.g., MU-PPDU 2) at the same time for the specific STA (e.g., STA2).

Figure 9:
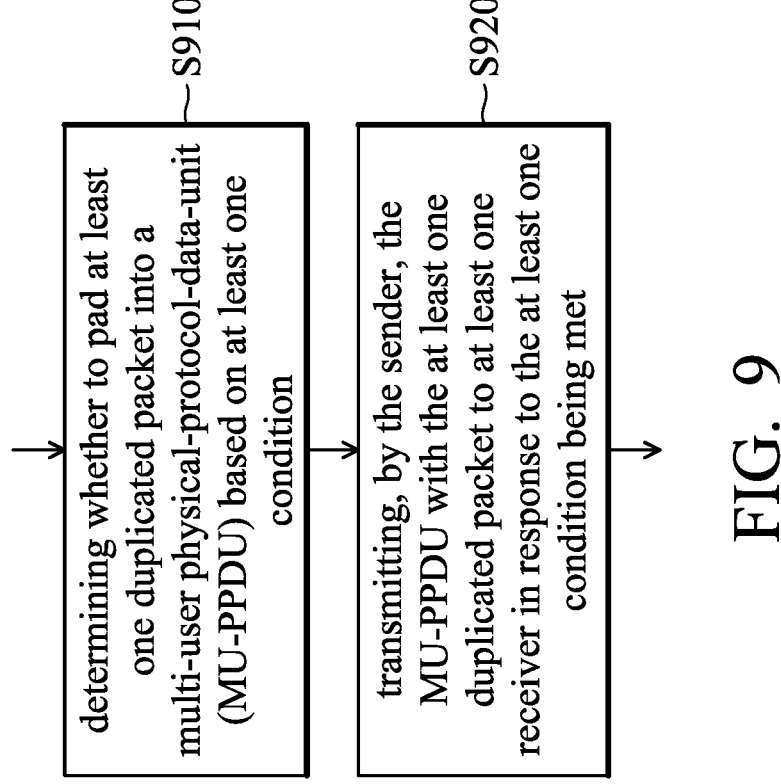
FIG. 9 is a flow chart illustrating a duplicated packet transmission method according to an embodiment of the invention.

FIG. 9 is a flow chart illustrating a duplicated packet transmission method according to an embodiment of the invention. The duplicated packet transmission method can be applied to the wireless communication system 100. As shown in FIG. 9, in step S910, the sender may determine whether to pad at least one duplicated packet into a multi-user physical-protocol-data-unit (MU-PPDU) based on at least one condition.

In step S920, the sender may transmit the MU-PPDU with the at least one duplicated packet to at least one receiver in response to the at least one condition being met.

In some embodiments of the invention, in the duplicated packet transmission method, in the MU-PPDU, the number of the at least one duplicated packet for different resource unit (RUs) in the MU-PPDU is different or the same.

In some embodiments of the invention, in the duplicated packet transmission method, the at least one condition is that the delimiter ratio in the MU-PPDU exceeds the threshold.

In some embodiments of the invention, in the duplicated packet transmission method, the at least one condition is that the packet error rate in the MU-PPDU is higher than a threshold.

In some embodiments of the invention, in the duplicated packet transmission method, in a downlink (DL) transmission for a single-link, the sender is an access point (AP).

In some embodiments of the invention, in the duplicated packet transmission method, in an uplink (UL) transmission for a single-link, the sender comprises a plurality of stations (STAs) corresponding to the MU-PPDU. The plurality of STAs may receive a trigger configuration from the AP. Then, the plurality of STAs may determine whether to pad the at least one duplicated packet into the MU-PPDU based on the trigger configuration and the at least one condition.

In some embodiments of the invention, in the duplicated packet transmission method, in a multi-link transmission, the sender may pad the at least one duplicated packet into the MU-PPDU in a first link or pad the at least one duplicated packet into another MU-PPDU in a second link.

In the duplicated packet transmission method provided in the invention, the duplicated packets may be padded in the padding area in the MU-PPDU rather than the delimiters. Therefore, the padding area in the MU-PPDU will not be wasted, and the packet error rate will be reduced.

Use of ordinal terms such as "first", "second", "third", etc., in the disclosure and claims is for description. It does not by itself connote any order or relationship. The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A duplicated packet transmission method, comprising:
determining, by a sender, whether to pad at least one duplicated packet into a multi-user physical-protocol-data-unit (MU-PPDU); and
transmitting, by the sender, the MU-PPDU with the at least one duplicated packet to at least one corresponding receiver among multiple receivers, wherein the at least one duplicated packet is padded in a same RU in the MU-PPDU allocated for the same corresponding receiver.

2. The duplicated packet transmission method of claim 1, wherein in the MU-PPDU, a number of the at least one duplicated packet for different resource unit (RUS) in the MU-PPDU is different or the same.

3. The duplicated packet transmission method of claim 1, wherein the determining is based on at least one condition, wherein the at least one condition comprises that a delimiter ratio in the MU-PPDU is higher than a threshold.

4. The duplicated packet transmission method of claim 1, wherein the determining is based on at least one condition, wherein the at least one condition comprises that a packet error rate in the MU-PPDU is higher than a threshold.

5. The duplicated packet transmission method of claim 1, wherein in a downlink (DL) transmission for a single-link, the sender is an access point (AP).

6. The duplicated packet transmission method of claim 1, wherein in an uplink (UL) transmission for a single-link, the sender comprises a plurality of stations (STAs) corresponding to the MU-PPDU.

7. The duplicated packet transmission method of claim 6, further comprising:
receiving, by the plurality of STAs, a trigger configuration from an AP; and
determining, by the plurality of STAs, whether to pad the at least one duplicated packet into the MU-PPDU based on the trigger configuration.

8. The duplicated packet transmission method of claim 1, wherein in a multi-link transmission, the method further comprises:
padding, by the sender, the at least one duplicated packet into the MU-PPDU in a first link; or
padding, by the sender, the at least one duplicated packet into another MU-PPDU in a second link.

9. A sender for a duplicated packet transmission, comprising:
a processor, determining whether to pad at least one duplicated packet into a multi-user physical-protocol-data-unit (MU-PPDU); and
a transceiver, transmitting, the MU-PPDU with the at least one duplicated packet to at least one corresponding receiver among multiple receivers, wherein the at least one duplicated packet is padded in a same RU in the MU-PPDU allocated for the same corresponding receiver.

10. The sender of claim 9, wherein in the MU-PPDU, a number of the at least one duplicated packet for different resource unit (RUs) in the MU-PPDU is different or the same.

11. The sender of claim 9, wherein the determining is based on at least one condition, wherein the at least one condition comprises that a delimiter ratio in the MU-PPDU is higher than a threshold.

12. The sender of claim 9, wherein the determining is based on at least one condition, wherein the at least one condition comprises that a packet error rate in the MU-PPDU is higher than a threshold.

13. The sender of claim 9, wherein in a downlink (DL) transmission for a single-link, the sender is an access point (AP).

14. The sender of claim 9, wherein in an uplink (UL) transmission for a single-link, the sender comprises a plurality of stations (STAs) corresponding to the MU-PPDU.

15. The sender of claim 14, wherein the transceiver of each of the plurality of STAs receives a trigger configuration from an AP and the processor of each of the plurality of STAs determines whether to pad the at least one duplicated packet into the MU-PPDU based on the trigger configuration.

16. The sender of claim 9, wherein in a multi-link transmission, the processor further pads the at least one duplicated packet into the MU-PPDU in a first link or pads the at least one duplicated packet into another MU-PPDU in a second link.

17. A station (STA) for a duplicated packet transmission, comprising:

a processor; and a transceiver, receiving a downlink (DL) multi-user physical-protocol-data-unit (MU-PPDU) with at least one duplicated packet from an access point (AP), and transmitting a medium access control (MAC) PDU (MPDU) with the at least one duplicated packet in the MU-PPDU to the AP, wherein the at least one duplicated packet is padded in a same RU in the MU-PPDU allocated to the AP.

18. The STA of claim 17, wherein the at least one duplicated packet is padded into the MU-PPDU in response to at least one condition being met, wherein the at least one condition comprises that a delimiter ratio in the MU-PPDU is higher than a threshold, or a packet error rate in the MU-PPDU is higher than a threshold.

19. The STA of claim 17, wherein in an uplink (UL) transmission for a single-link, the transceiver receives a trigger configuration from the AP and the processor determines whether to pad the at least one duplicated packet into the MU-PPDU based on the trigger configuration.

20. The STA of claim 17, wherein in multi-link transmission, the at least one duplicated packet is padded into the MU-PPDU in a first link or the at least one duplicated packet is padded into another MU-PPDU in a second link.

* * * * *